F. P. BAUMANN.

DRY BATTERY.

APPLICATION FILED MAY 27, 1920.

Reissued Aug. 17, 1920.

14,929.

Ferdinand P. Baumann INVENTOR

BY

Rosenbaum Stockbridge & Borst

ATTORNEYS

UNITED STATES PATENT OFFICE.

FERDINAND P. BAUMANN, OF KÜSNACHT, SWITZERLAND, ASSIGNOR, BY MESNE ASSIGNMENTS, TO G. H. REIN, OF NEW YORK, N. Y.

DRY BATTERY.

14,929. Specification of Reissued Letters Patent. Reissued Aug. 17, 1920.

Original No. 1,267,620, dated May 28, 1918, Serial No. 79,198, filed February 18, 1916. Application for reissue filed May 27, 1920. Serial No. 384,737.

*To all whom it may concern:*

Be it known that I, FERDINAND PAUL BAUMANN, a citizen of the Swiss Confederation, residing at Küsnacht, Canton Zurich, Switzerland, have invented new and useful Improvements in Dry Batteries, of which the following is a specification.

The invention relates to dry batteries of the kind in which the electrodes of each couple are in the form of plates between which the electrolyte is confined.

The novel feature of my invention consists of a battery in which each couple comprises a carbon plate and a metallic plate arranged face to face, with a cavity located between them, in which a soft electrolyte is confined, the carbon plate having its exterior face impregnated with a filler which enters the pores at the surface only, said impregnated face being also provided with a metal frame or covering adapted to rest against the negative electrode of the next adjoining couple.

Figure 1:
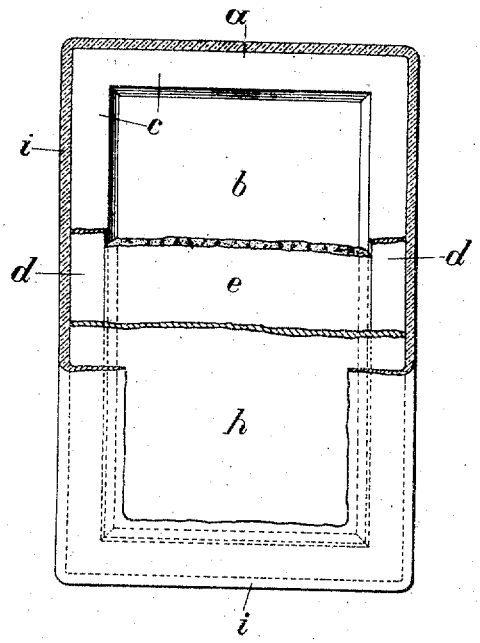
Figure 2:
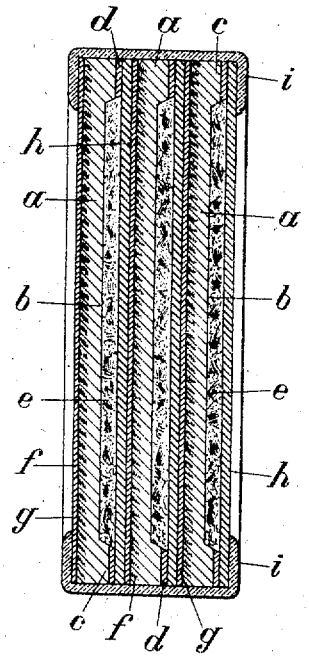

Reference is now had to the accompanying drawing, in which:

Figure 1 is a fractional front elevation, and Fig. 2, a vertical section of one form of my improved dry battery.

In this form of battery, shown by way of an example, it is presumed that the elements in respect of materials are built on the Leclanché system. The battery is composed of three couples of plate-electrodes. The positive electrode *a*, consisting of a mixture of manganese dioxid and graphite, has on one side the cavity *b* surrounded by a border *c* to which is applied an insulating layer *d*. In the cavity *b* of each element is filled a pasty electrolyte *e* containing ammonia-solution, that is to say ammonium hydroxid, said electrolyte being flush with the surface of the insulating layer *d*. On the opposite side to that having the cavity *b*, the electrodes *a* are impregnated to a suitable depth in the pores with a filling substance or mass *f* such as paraffin. The impregnation prevents the damp, drawn from the electrolyte *e* into the electrode *a*, from passing through to the opposite side. Over each of the impregnated sides of the electrode is applied a thin covering *g* of good conducting material such for example as copper. The application of the covering is advantageously carried out in the galvanic manner by deposition, to form a coating of good conducting material, for example copper, applied so as to establish intimate contact between the carbon electrode of the one element and the zinc of the adjacent element. Each element comprises, adjacently to the electrolyte *e* and insulating layer *d*, a negative zinc-electrode *h*. The three couples forming the battery are placed close together with the electrodes of opposite polarity in contact. The coverings *g* rest against the zinc plates *h* and insure a good permanent contact between the several elements.

For keeping the battery securely together a non-conducting sheath *i* is provided which may be of paraffin for example. The finished battery forms a compact body and can be easily introduced in any electric circuit.

The improved battery has, in comparison with the usually known batteries, the advantage of being easily and cheaply manufactured. The same is especially advantageous for pocket lamps, these being hitherto furnished with batteries of more or less difficult construction requiring great care and accuracy in fitting and imposing an elevated price for the lamp.

I claim:

1. A dry battery of the kind having plate electrodes of which the carbon electrodes are impregnated with impervious substances and formed with a cavity at one side for the reception of soft electrolyte which is in contact with the negative electrode each of which latter is in contact with the positive of the adjacent element, fitted with carbon electrodes impregnated to a suitable depth at the face rearward of the cavity only where the impregnating substances is made to form only a complete surface filling layer for the pores, and a metal frame applied to the impregnated face of each carbon electrode to serve as solid contact portion with the adjacent negative electrode.

2. A battery comprised of a plurality of electrical couples each consisting of a carbon and a metal electrode in flat plate form arranged face to face, one of the electrodes having a cavity on its face against which the other electrode is presented said cavity containing an electrolyte, the carbon electrodes being impregnated on their outer faces with a filler which penetrates the pores at the surface only, the said couples being assembled with the carbon and metal electrodes of adjacent couples in surface contact with each other.

3. A battery unit comprising a carbon electrode in plate form, an opposite metallic electrode also in plate form and arranged against one face of the carbon plate but insulated therefrom, a cavity being provided between said plates and containing an electrolyte, the carbon plate being impregnated throughout its exterior face with an impervious filling which penetrates the pores at the surface thereof only to which face is also intimately attached a metal covering.

In witness whereof I hereunto subscribe my signature at Zurich, Switzerland, this 15th day of April 1920.

FERDINAND P. BAUMANN.

Witnesses:
O. M. Anrig,
A. Du Bois.